United States Patent [19]

Korten

[11] 4,138,075
[45] Feb. 6, 1979

[54] COMBINATION KNOB FOR FISHING REELS

[76] Inventor: Chauncey F. Korten, 2410 Vinewood Blvd., Ann Arbor, Mich. 48104

[21] Appl. No.: 831,494

[22] Filed: Sep. 8, 1977

[51] Int. Cl.² .................. A01K 89/00; G05G 1/10
[52] U.S. Cl. ......................... 242/84.1 J; 74/545; 74/557
[58] Field of Search ............ 242/84.1 J, 84.1 R, 242/84.2 R, 84.2 A, 217, 219, 211, 84.5, 84.51, 218, 84.8; 74/545, 557, 543, 553

[56] References Cited

U.S. PATENT DOCUMENTS

| 1,407,537 | 2/1922 | Hodges et al. | 242/84.51 R |
| 2,002,403 | 5/1935 | Kosma | 74/543 |
| 3,071,023 | 1/1963 | Herr et al. | 74/545 |
| 3,078,058 | 2/1963 | Roe | 242/84.8 |
| 3,498,561 | 3/1970 | Smith | 242/84.1 J |

FOREIGN PATENT DOCUMENTS 1018130  1/1966  United Kingdom ............... 242/84.1 J Primary Examiner—Billy S. Taylor
Attorney, Agent, or Firm—Flam & Flam

[57] ABSTRACT

The swivelled knob provides an exterior grip portion and a laterally opening finger defined by a thin walled flange. These characteristics provide optimum characteristics for three modes of reel operation: power retrieval for bringing in a catch; fast retrieve of a line and lure by a finger twirling operation; and sensitive lure retrieve or play by engagement of the thin walled flange by the opposed thumb and forefinger.

6 Claims, 4 Drawing Figures

COMBINATION KNOB FOR FISHING REELS

FIELD OF INVENTION

This invention relates to fishing tackle, and particularly, to a knob or handle for a fishing reel.

BACKGROUND OF THE INVENTION

A knob for operation of a fishing reel accomplishes one basic function, namely, the application of a torque for rotation of the winding mechanism of a fishing reel. However, this function is achieved in different manners according to how the fishing reel is being used. For retrieval of a catch, the knob is gripped by the entire hand for efficient transfer of power to the winding mechanism. For retrieval of the line and lure, such as for changing equipment, the application of power is of no concern. The main consideration is speed. For playing the bait or lure, the line often is retracted slowly. Neither speed nor power is a consideration. Rather, the main interest is to establish a sensitive coupling between the line and the fisherman's hand so that he can feel what is happening at the distal end of the line. In general, fishing reels have not been designed to facilitate all three functions.

The primary object of the present invention is to provide a knob that meets the varying requirements of the fisherman: fast retrieval, power retrieval and sensitive play.

SUMMARY OF INVENTION

In order to accomplish the foregoing object, I provide a hollow knob that provides a laterally opening finger recess surrounded by a thin walled annular flange. The exterior surface of the knob may be gripped by the hand for power retrieval. The index finger fits the recess so that, by a rapid twirling action, the reel mechanism can be quickly rotated. The thin walled annular flange may be interposed between the thumb and forefinger to provide a sensitive but confortable coupling whereby the fisherman can feel action at the distal end of the line.

BRIEF DESCRIPTION OF THE DRAWINGS

A detailed description of the invention will be made with reference to the accompanying drawings wherein like numerals designate corresponding parts in the several figures. These drawings, unless described as diagrammatic or unless otherwise indicated, are to scale.

DETAILED DESCRIPTION OF THE PREFERRED EMBODIMENT

The following detailed description is of the best presently contemplated modes of carrying out the invention. This description is not to be taken in a limiting sense, but is made merely for the purposes of illustrating the general principles of the invention, since the scope of the invention is best defined by the appended claims. Structural and operational characteristics attributed to forms of the invention first described shall also be attributed to forms later described, unless such characteristics are obviously inapplicable or unless specific exception is made.

Figure 1:
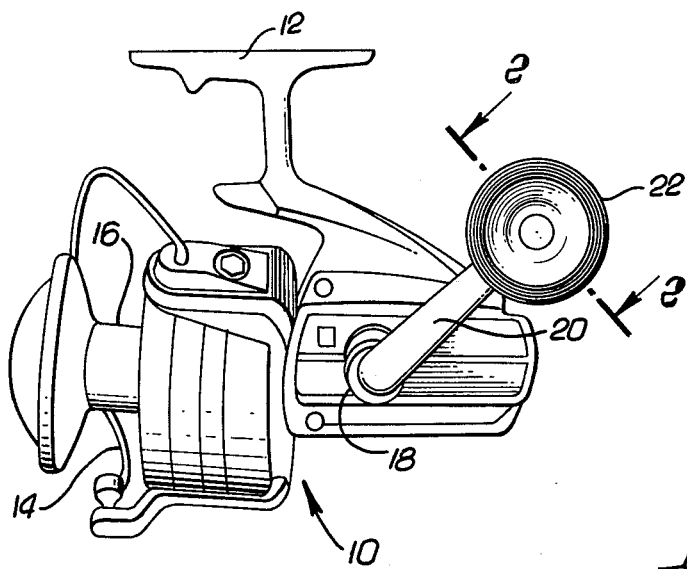
FIG. 1 is a side elevational view of a fishing reel incorporating the present invention.

In FIG. 1 there is illustrated a typical fishing reel 10 having a usual mounting base 12 for attachment to a fishing rod (not shown). In the present example, the spinning reel utilizes a rotatable bail 14 for winding the line (not shown) upon a nonrotary spool 16. This fishing reel is shown by example only; the improvement that is the subject of this application is applicable to fishing reels of all types and description, large and small.

Figure 2:
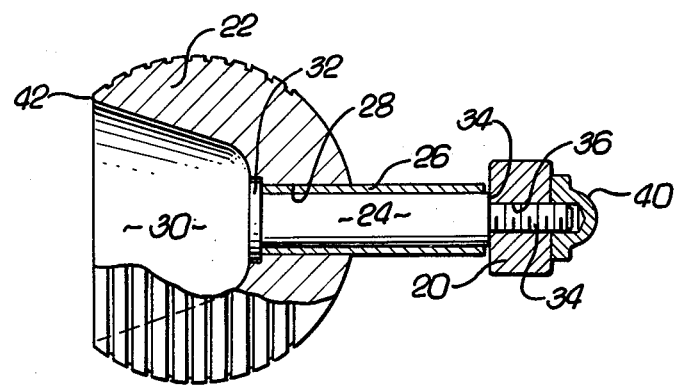
FIG. 2 is an enlarged sectional view of the knob taken along a plane corresponding to line 2—2 of FIG. 1.

The reel 10 has a windup mechanism accommodated in its case that may include a variety of auxiliary devices. The windup mechanism is operated by a shaft 18 rotated by a crank or handle 20. On the end of the handle 20 is a knob 22. The knob 22 is mounted on the end of the handle 20 by the aid of a laterally projecting pin 24 (FIG. 2). For this purpose, the knob 22 carries a journal sleeve 26 press-fitted in a bore 28 that intersects the bottom of a large annular recess 30. The recess is deep enough and wide enough for insertion of a substantial length of the index finger of the user for purposes hereinafter to be described.

The pin 24 has a head 32 that overlies the inner end of the journal sleeve whereby the knob is confined on the pin 24. The pin has a reduced end 34 that passes through a mounting aperture 36 in the crank or handle 20. The pin has a shoulder 38 at the base of the reduced end 34 that is drawn against the side of the crank or handle 20 by a fastener 40. The length of the pin between the head 32 and the shoulder 38 is slightly greater than the length of the sleeve 26 to ensure that the knob is freely rotatable on the pin.

The knob has three important characteristics which facilitate an operational mode of the fishing gear. First, the peripheral surface of the knob is of large enough size to be easily gripped for power retraction of a catch. The knob is of a size to fit comfortably in a closely cupped hand, say, about 4 centimeters in diameter. The knob may be exteriorly knurled or it may be cast of material having a desirable gripping characteristic. In the present instance, the knob is shown as having a series of peripheral grooves extending circularly about the mouthing axis of the knob. The knob is by no means flimsy or small; it provides the requisite heft to fit comfortably in the user's hand for power retrieval.

The second operational mode is fast retrieval of the line for change of lure, bait or equipment. In this instance, the circular cranking motion imparted by a firm grip on the knob becomes excessively laborious and slow. To achieve fast retrieval, the index finger of the user is inserted into the recess 30. The opening to the recess is about 2½ or 3 centimeters in diameter easily, but with reasonable closeness, to receive the user's index finger. A simple twirling motion of the finger now retrieves the line in a hurry. The transmission of high forces between the finger and the knob is impossible, but not required for fast retrieval.

The third important operational mode is playing of the bait or lure, as by intermittent or continuous slow retraction of the line. During this mode, it is of utmost importance that the slightest action at the bait or lure be transmitted to the fisherman - a delicate engagement of the knob between the thumb and forefinger. This is made possible by engagement of the knob surfaces adjoining the recess edge 42 both on the inside and the outside of the recess. This knob wall at the edge 42 is relatively thin so as comfortably to fit between opposed thumb and forefinger. From this mode, the user can readily shift to the power retrieval mode or the fast retrieval mode.

Despite the simplicity of the knob, it possesses the requisite versatility.

DETAILED DESCRIPTION OF ALTERNATE EMBODIMENTS

Figure 3:
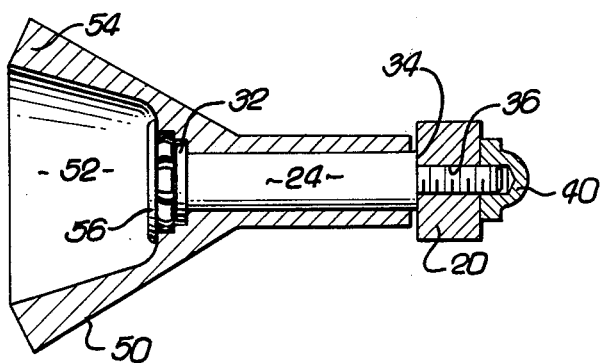
FIG. 3 is a sectional view similar to FIG. 2, but illustrating a modified form of the present invention.

In the form of the invention illustrated in FIG. 3, the knob 50 has a generally conical configuration rather than a sperical or bulbous configuration. If made of the same material as the knob 22 shown in FIGS. 1 and 2, the knob 50 has less mass. The knob recess 52 determines, with the exterior conical configuration, an annular rim 54 that progressively decreases in thickness. In the sensitive lure or bait playing mode, the user may move his thumb and forefinger inwardly or outwardly of the knob until a comfortable separation of the thumb and forefinger is achieved. The knob 50 yet has the heft requisite for comfortable power retrieval.

The actual mass of the knob is a factor worth considering. For example, the knob, if of sufficient mass, may upon sudden movement, set up a sympathetic reaction in the bail mechanism causing it to assume an unintended position. The knob of FIG. 3, being of less mass, is less likely to cause such interference.

In the present instance, a button 56 snaps into the bottom of the recess to shield the finger from engagement with the head of the mounting pin. Relative rotation of the pin and the knob may be disturbing if perceived by the user.

Figure 4:
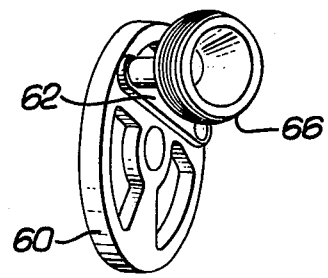
FIG. 4 is a pictorial view of a modified handle structure incorporating the present invention.

In the form of the invention illustrated in FIG. 4, the handle upon which the knob is mounted is a composite structure including a crank wheel 60 attached to the reel power shaft, and a lever 62 eccentrically pivoted to the crank wheel 60. By angularly moving the lever 62, the effective cranking length is changed in a known manner. The knob 66, mounted on the end of the lever 62, has the same operational characteristics attributed to the knob 22.

Intending to claim all novel, useful and unobvious features shown or described, I make the following claims:

1. In a fishing reel having a winding mechanism and a crank rotatable about an axis for operating the winding mechanism, the combination therewith of:
   (a) a knob mounted on said crank for free rotation about its own axis, said axis being substantially parallel and spaced from each other;
   (b) said knob having a maximum diameter of approximately 4.0 centimeters to fit comfortably in the closely cupped hand of the user for power rewind;
   (c) said knob having an axially extending annular recess opening laterally thereof; said recess having a diameter of about 2.5 to 3 centimeters to receive part of the index finger of the user for fast rewind by twirling movement of the user's index finger;
   (d) said knob having a thin walled annular part at the outer edge of said knob recess for delicate engagement between the opposed thumb and forefinger of the user.

2. The combination as set forth in claim 1 in which said knob is mounted on said crank by the aid of a headed pin projecting laterally of said crank, there being a sleeve attached to said knob and projecting therefrom on the side of said knob opposite said recess, said sleeve being journalled on said pin with the head of the pin fitting the bottom of said knob recess.

3. The combination as set forth in claim 1 in which said knob has a wide axially extended peripheral contour for providing a substantial grip area.

4. The combination as set forth in claim 2 together with a closure mounted in the bottom of the recesss and shielding said pin head from the user's finger.

5. The combination as set forth in claim 3 in which said knob has a substantially spherical peripheral contour, said thin walled part tapering to the said outer edge of said recess.

6. The combination as set forth in claim 3 in which said knob has a substantially conical peripheral contour thin walled part.

* * * * *